(12) United States Patent
Kim et al.

(10) Patent No.: US 8,989,224 B2
(45) Date of Patent: *Mar. 24, 2015

(54) APPARATUS FOR FEMTOSECOND LASER OPTICALLY PUMPED BY LASER DIODE PUMPING MODULE

(71) Applicant: Korea Electrotechnology Research Institute, Changwon (KR)

(72) Inventors: Guang Hoon Kim, Busan (KR); Uk Kang, Seoul (KR); Ju Hee Yang, Seoul (KR); Elena Sall, Seoul (KR); Sergey Chizhov, Seoul (KR); Andrey Kulik, Seoul (KR)

(73) Assignee: Korea Electrotechnology Research Institute, Changwon (KR)

( * ) Notice: Subject to any disclaimer, the term of this patent is extended or adjusted under 35 U.S.C. 154(b) by 28 days.

This patent is subject to a terminal disclaimer.

(21) Appl. No.: 13/853,074

(22) Filed: Mar. 29, 2013

(65) Prior Publication Data

US 2013/0223470 A1 Aug. 29, 2013

Related U.S. Application Data

(63) Continuation-in-part of application No. 13/562,045, filed on Jul. 30, 2012, now Pat. No. 8,594,141.

(30) Foreign Application Priority Data

Aug. 22, 2011 (KR) .................. 10-2011-0083565

(51) Int. Cl.
*H01S 3/098* (2006.01)
*H01S 3/0941* (2006.01)
*H01S 3/02* (2006.01)
*H01S 3/08* (2006.01)
*H01S 3/11* (2006.01)
*H01S 3/16* (2006.01)
*H01S 3/04* (2006.01)

(52) U.S. Cl.
CPC ............ H01S 3/09415 (2013.01); H01S 3/025 (2013.01); *H01S 3/08036* (2013.01); *H01S 3/1118* (2013.01); *H01S 3/1618* (2013.01); *H01S 3/0401* (2013.01); *H01S 3/1675* (2013.01)
USPC ................... 372/18; 372/34; 372/30; 372/75; 372/107

(58) Field of Classification Search
CPC ... H01S 3/1106; H01S 3/025; H01S 3/09415; H01S 3/08036; H01S 3/1118; H01S 3/1675; H01S 3/0461; H01S 3/1618
USPC .................................. 372/18, 30, 34, 75, 107
See application file for complete search history.

(56) References Cited

U.S. PATENT DOCUMENTS 8,594,141 B2 * 11/2013 Kim et al. ....................... 372/18

FOREIGN PATENT DOCUMENTS

| JP | 06-275889 A | 9/1994 |
| JP | 07-058377 A | 3/1995 |

(Continued)

*Primary Examiner* — Kinam Park
(74) *Attorney, Agent, or Firm* — Patent Office of Dr. Chung Park

(57) ABSTRACT

There is disclosed an apparatus for femtosecond laser optically pumped by a laser diode pumping module that is able to mechanically couple optical mounts for mounting optical mounts to each other by using a bar with a low thermal expansion coefficient and to form a light pumping module distant from a laser platform or a case, to provide a stable mode locking for an ultrashort laser and to enhance a power stability and a beam stability.

13 Claims, 14 Drawing Sheets

(56) References Cited

FOREIGN PATENT DOCUMENTS

| | | |
|---|---|---|
| JP | 07-026085 U | 5/1995 |
| JP | 09-179155 A | 7/1997 |
| JP | 10-273124 A | 10/1998 |
| JP | 11-233855 A | 8/1999 |
| JP | 2001-108408 A | 4/2001 |
| JP | 2005-005627 A | 1/2005 |
| JP | 2006-256063 A | 9/2006 |
| KR | 1020100110109 A | 10/2010 |
| KR | 10-2011-0035111 A | 4/2011 |

* cited by examiner

FIG. 1 [PRIOR ART]
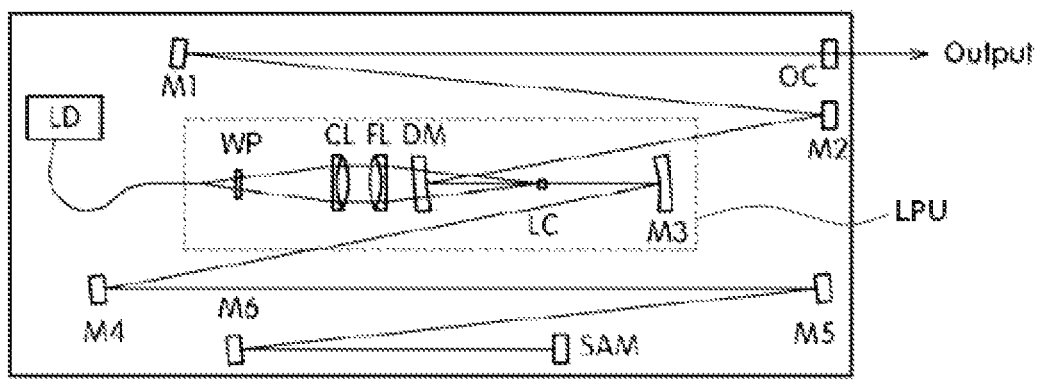

FIG. 2A [PRIOR ART]
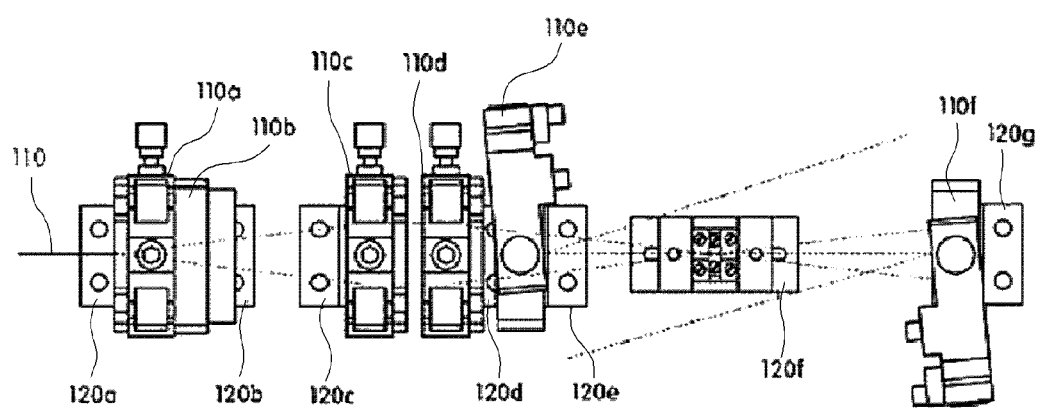
FIG. 2B [PRIOR ART]
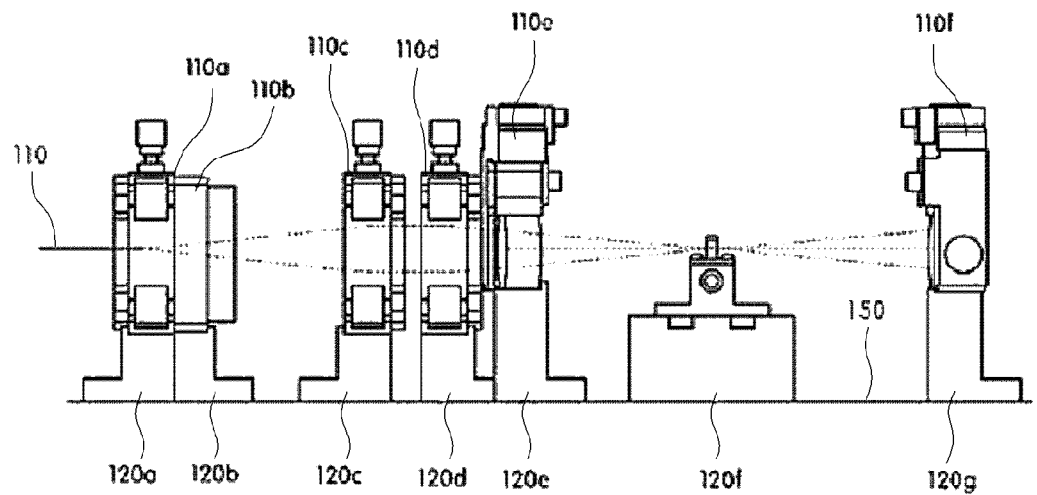

FIG. 3 [PRIOR ART]
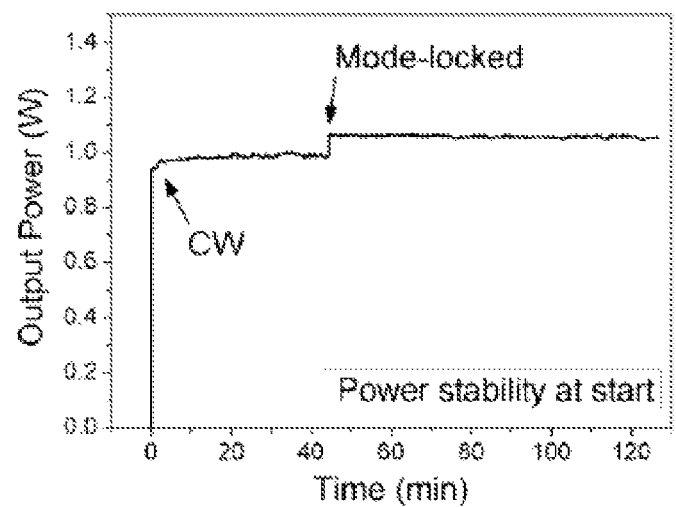

APPARATUS FOR FEMTOSECOND LASER OPTICALLY PUMPED BY LASER DIODE PUMPING MODULE

CROSS REFERENCE TO RELATED APPLICATIONS

This application is a continuation-in-part of U.S. patent application Ser. No. 13/562,045, filed on Jul. 30, 2012, which claims the benefit of Korean Application No. 10-2011-0083565, filed on Aug. 22, 2011, which is hereby incorporated herein by reference in its entirety.

FIELD

The present invention relates to an apparatus for femtosecond laser, more particularly, to an apparatus of a femtosecond optically pumped by a laser diode pumping module that is able to provide a stable mode locking at a femtosecond laser and to enhance a power stability and a beam stability.

BACKGROUND

Generally, the femtosecond laser pulse has good properties. Examples of the good properties include a short pulse time width, a high peaking power and a broad spectrum bandwidth.

Such characteristics enables a femtosecond laser system applied to various fields and examples of such various fields include ultraprecision of various materials, non-linear optics, biotechnology, chemistry, physics and health care application.

For example, a ultrashort laser pulse in a femtosecond range can minimize thermal diffusion in a processing range and generate no residual damage such that the femtosecond laser pulse can process a hard material difficult to mechanically process and a high peak power possessed thereby can realize a non-linear optical effect of multiphoton absorption used in processing a transparent material including glass and polymer into a variety of nano-scaled structures.

The laser stability means that such elements are maintained constant with respect to the time as a power applied to a target of a laser, a position of an applied beam, spatial traveling of a beam and a distribution type of beams.

In case a laser has to be applied to a target at a predetermined distance in laser processing, the laser stability is very important.

Especially, the laser stability is more important in case of ultraprecision laser processing having a nanometer leveled precision that uses a ultrashort laser such as a femtosecond laser.

The beam stability means that a beam is stably traveling at a uniform spatial position and a uniform angle and it is closely related with applications including laser processing.

The beam stability may be technically categorized into a beam positional stability related with changing positions from a target to a beam and a beam angular stability showing variations of angles when beams are focused on a target.

Typically, such the beam stability is called as 'a beam pointing stability'.

Elements affecting the laser stability may include physical vibration, mechanical deformation, changes of thermal distribution, instability of a resonance capacity and internal and external factors such as air flow.

An ultrashort laser is sensitive to such internal and external factors out of them and various efforts are made to enhance the laser stability.

The ultrashort laser of which an exemplary example is a femtosecond laser is oscillated in an oscillator by mode locking and it is highly sensitive to micro-variations of an optical passage only to be sensitive to mechanical deformation of optical mounts generated by variations in ambient temperatures, such that power characteristics of the ultrashort laser could be sensitively changed.

Accordingly, most of femtosecond lasers are installed and operated in a clean room having a thermostatic chamber capable of maintaining an ambient temperature no more than ±0.5 stably for stable operation.

However, there have to be locally a difference between temperatures near optical mounts including mounts related with light pumping where a high power pumping light is applied and laser material mounts or near a laser power device having a cooling fan to emit much heat outside and a cooling device.

In other words, in case of a femtosecond laser, change in external temperatures of a space where a laser is installed and internal temperatures near optical components locally can affect power characteristics of laser.

Accordingly, it is vitally important to mechanically configurate a structure of a femtosecond laser system least sensitive to change in the temperatures.

An exemplary example of conventional femtosecond lasers is a laser using a Ti:Sapphire as a media.

A Ti:Sapphire material has a broad radiated spectrum band wavelength to 100 nanometers and can generate quite a short pulse even several femtosecond pulse.

Green light sources emitted from $Dn:YVO_4$ pumped by a high power diode to pump energy outside are focused on Ti-Sapphire laser material in dozes to hundreds of micrometers.

At this time, the pumping light source is spaced apart several meters from Ti:Sapphire structurally and a power characteristic stability of the pumped lights is vitally important to operate the Ti:Sapphire stably.

For example, if a pointing stability of pumped lights is not proper, a spot position of the pumped lights focused in the Ti:Sapphire laser material, with a dozens of and hundreds of micrometer size is changing, failing to be uniform, such that the mode coupling between the pumped lights and the laser beam is changing constantly enough to deteriorate the laser power stability.

At this time, the mode coupling means the coupling configured to make the spatial distribution of laser beams coincide with the spatial distribution of pumped lights within the laser material substantially.

For example, when characteristics including an output power and an output beam direction are deteriorated, the result of the laser processed product cannot but be bad.

To overcome that, a reflection mirror is installed in an optical mount having a control device capable of controlling the beam direction precisely mounted therein and pumped lights are controlled to pass the reflection mirror and the output stability can be controlled accordingly.

However, the system has to be large-sized and complex to control relatively many optical components simultaneously and also the price of the system has to rise disadvantageously.

Accordingly, only one or two optical components are mounted in such a control device.

In contrast, the high power beam emitted from a semiconductor laser diode can overcome the disadvantage of the high-priced laser for light pumping, such that the disadvantages of the Ti-Sapphire laser including the price, size and stability of the equipment can be solved more easily.

Moreover, if the high power laser diode as the pumping light source can be positioned near to the laser material as close as dozens of or several centimeters, the stability of the ultrahigh speed laser can be enhanced more.

If an amplifier used so as to enhance the power of the ultrahigh laser can pump the lights by using the high power laser diode in a continuous wave mode not in a pulse mode, the amplifier can operate the laser more stably.

When a femtosecond pulse is generated first in a femtosecond oscillator in a mode locking, the pulse energy is very low by a nanojoule (nJ) and it is not proper to apply the femtosecond pulse to the laser processing.

To heighten the energy of the femtosecond pulse, Chirped Pulse Amplification (CPA) is used.

A pulse generated from a femtosecond oscillator is stretched longitudinally and timely. After that, the timely stretched pulse is applied to a femtosecond amplifier to amplify the pulse energy. Hence, the amplified pulse passes a pulse compressor to restitute a time width of the pulse to an initial femtosecond range. The pulses generated from the oscillator are employed as seeding pulses applied to the amplifier.

It is vitally important in the stability of the femtosecond amplifier to combine the seeding pulse and an amplifier resonance capacity mode with each other in the laser material stably.

Accordingly, the stability of the oscillator is more important in the femtosecond laser system having the amplifier.

According to one method for enhancing the stability of the femtosecond laser, an inner part of one aluminum block is digging to fabricate a laser case. Except a top cover, the other parts of the laser case is integrally fabricated as one body and mechanical deformation of the case generated by temperature change can be minimized.

In addition, there are efforts of minimizing the temperature change after a high power diode mounted module or a laser material module is fabricated of copper having a high heat conductivity, with cold water having a constant temperature flow therein.

Not only such modules but also a cooling water line enabling the cold water to flow there through is provided in the laser case to minimize the temperature change.

However, when the laser power is re-connected and operated the next day after operating the laser and power off, it is frequently found that laser characteristics are deteriorated.

This is because the mechanical deformation generated by the cooling during the power-off is not restored completely.

To overcome that, there are commercial femtosecond laser systems that encourage to operate the laser system including the pumping light source and the cooling device having the cold water for 24 hours to maintain a stable state.

However, it is not easy to maintain each of the optical mounts composing the laser resonance capacity at a set temperature.

To reduce power changes according to the time and spatial change of the beams having the pointing stability, it is vitally important to stably maintain the mode coupling of coupling the pumping lights applied from the outside with beams inside the resonance capacity within the laser material spatially.

It is not easy to maintain the mode coupling stably, because of the beam stability, if the pumping light applied outside is distant from the laser material.

Accordingly, the laser diode as the pumping light is located close to the laser material and the pumping light is directly applied to the laser material.

The high power pumping light is applied outside and the high power laser beam is generated in the laser resonance capacity. Because of that, the high power is transmitted to the optical mount having optical components such as an optical mirror, a laser platform and a laser as a type of heat.

The transmitted heat might cause the mechanical deformation of the optical mount and the mechanical deformation might change directions of the optical components slightly to make the arrangement of the laser resonance capacity in disorder, such that the laser power characteristics might be deteriorated.

Especially, the ultrashort laser such as the femtosecond laser uses mode locking so as to generate the femtosecond pulse and the mode locking is very sensitive to the deformation of the resonance capacity. Because of that, the stability of the femtosecond pulse could be deteriorated or the mode locking could be maintained any more to generate no femtosecond pulse.

For example, a type of the femtosecond laser realized by experiments is shown in an optical conceptual diagram of FIG. 1.

In FIG. 1, LC refers to a laser material and M1~M6 refer to a reflection mirror. SAM refers to a saturable absorber mirror and DM refers to a dichroic reflection mirror. OC refers to a power coupling mirror and MD refers to a laser diode. WP refers to a half-wave plate and CL refers to a collimating lens and FL refers to a focusing lens.

A doted-line block shown in FIG. 1 refers to a light pumping unit (LPU).

To realize such an optical conceptual diagram, the optical components including those reflection mirrors are typically mounted in optical mounts, respectively, and they are coupled to laser platforms.

More specifically, FIGS. 2A and 2B show an apparatus realizing the doted-line block of FIG. 1. Using the high power laser diode outside the laser resonance capacity, energy is provided to the laser material positioned in the resonance capacity. In other words, FIG. 2A is a front view illustrating the light pumping units (LPU) having the conventional optical mounts coupled thereto independently and FIG. 2B is a plane view illustrating the light pumping units (LPU) having the conventional optical mounts coupled thereto independently.

The laser diode light pumping unit includes an optical fiber 110, an optical fiber mount 110a, a half-wave plate mount 110b, a collimating mount 110c, a focusing lens mount 110d, dichroic mirror mounts 110e and 110f, mount blocks 120a-120g installed in a laser platform 150 to support the mounts, respectively, and optical components corresponding to the others, respectively.

The result of FIG. 3 shows that the laser power is off in an optimized state and then on again after the laser power is completely cooled.

Here, even in case the power of the femtosecond laser in which the mode locking is stable is on, the mode locking is unbalanced and a continuous wave (CW) is generated. Accordingly, a mode locking starter has to be operated to be mode-locked again disadvantageously.

DETAILED DESCRIPTION OF THE INVENTION

Technical Problem

To solve those disadvantages, an object of the invention is to provide an apparatus of femtosecond optically pumped by a laser diode pumping module that is able to mechanically couple optical mounts for mounting optical mounts to each other by using a bar with a low thermal expansion coefficient and to form a light pumping module distant from a laser platform or a case, to provide a stable mode locking for an ultrashort laser and to enhance a power stability and a beam stability.

Technical Solution

To achieve these objects and other advantages and in accordance with the purpose of the embodiments, as embodied and broadly described herein, an apparatus of femtosecond optically pumped by a laser diode pumping module includes a laser diode for light pumping; a half-wave plate for adjusting a polarizing direction of a light generated from the laser diode; a collimating lens and a focusing lens for enhancing mode coupling with respect to the light of the laser diode and for focusing the light on the laser material; and dichroic mirrors arranged in both sides of the laser material, respectively, to reflect a laser beam generated via the laser material and to transmit a pumping light generated from the laser diode, wherein the half-wave plate, the collimating lens, the focusing lens and the dichroic mirrors are integrally connected with each other via mechanical coupling to form a light pumping module, in a state of being distant from a laser platform.

The apparatus of femtosecond optically pumped by the laser diode pumping module may further include a mount for mounting each of the half-wave plate, the collimating lens, the focusing lens and the dichroic mirrors thereon; at least one module coupling bar for coupling the mounts to each other, with passing through the mounts; and a module coupler arranged on the laser platform to fixedly support the module coupling bar.

The laser material may be directly installed on the laser platform by a laser material mount.

The apparatus of femtosecond optically pumped by the laser diode pumping module may further include a reflection beam blocker arranged in a rear end of the half-wave plate to be positioned on the laser platform.

A thermal expansion coefficient of the module coupling bar may be lower than a thermal expansion coefficient of the mounts or the module coupler.

The apparatus of femtosecond optically pumped by the laser diode pumping module may further include a laser material mount for supporting the laser material, wherein the laser material mount is assembled to the module coupling bar to be movable along a longitudinal direction of the module coupling bar.

The laser material mount may include a connecting block coupled to the module coupling bar; and a supporting block assembled to the connecting block to support the laser material.

In another aspect of the present invention, an apparatus of femtosecond optically pumped by a laser diode pumping module includes a laser diode for light pumping; a half-wave plate for focusing the light on the laser material; a collimating lens and a focusing lens for applying the light to a laser material, for enhancing mode coupling and for focusing the light on the laser material; a plurality of mounts for mounting the half-wave plate, the collimating lens, the focusing lens and the dichroic mirrors thereon, respectively; and at least one connection means for connecting the plurality of the mounts with each other.

In a further aspect of the present invention, an apparatus of femtosecond optically pumped by a laser diode pumping module includes an alignment unit mechanically assembled to sequentially align a half-wave plate, a collimating lens, a focusing lens and a dichroic mirror to form one light pumping module; and a coupler installed in a laser platform to be coupled to the alignment unit, such that the alignment unit may be spaced apart a predetermined space from a laser platform.

In other words, in the femtosecond laser apparatus using the laser diode light pumping, the optical mounts for mounting the optical components configured to pumping diode are mechanically coupled to each other by the bar having a lower thermal coefficient, only to form the pumping module. The bar may enable the ultrashort laser to provide the stable mode locking as the device enabling the module distant from the laser platform or the case. Also, the power stability and the beam stability can be enhanced.

Specifically, the optical mounts might be mechanically and locally deformed by the strong intensity pumping light source generated from the femtosecond laser. The mounts are mechanically coupled to each other to form the integral type module.

The modulation methods may include INVAR having a mechanical thermal coefficient almost closer to zero with respect to temperature variation.

The contact area between the module and the platform or case is minimized to minimize the external thermal deformation transmitted to the module.

The light pumping module is strongly mechanically stabilized even with temperature variation, such that the mode coupling between the pumping light source focused on the laser material and the laser resonance mode may be maintained stably to enhance the output stability and the beam stability of the laser.

INVAR is known as FeNi36 and as 64FENi in U.S.A and it is well-known to have a low thermal expansion coefficient as alloy of Nickel and Iron.

The name of INVAR comes from 'invariant' that means little expansion or contraction with respect to temperature variation.

INVAR has a thermal expansion coefficient of approximately $1.2 \times 10^{-6}$/K or less.

If the temperature is changed 1 degree at a normal temperature, a mechanical dimension is changed by approximately one-millionth.

Because of such thermal characteristics, INVAR is used in a precise device such as a clock requiring a high dimensional stability.

Thermal expansion coefficients are differentiated according to a chemical composition. There are various materials having a lower thermal expansion coefficient. Examples of the various materials include INVAR, SUPERINVAR and KOVAR.

Advantageous Effects

The embodiments have following advantageous effects.

According to the apparatus of femtosecond optically pumped by the laser diode pumping module, the optical mounts for mounting the optical mounts thereon are modulated integrally and the integrally modulated light pumping module is distant from the laser platform or the case, only to reduce the external heat transmitted to the light pumping module. Accordingly, the mechanical thermal deformation may be reduced and the light pumping module can be stabilized such that the stability of the laser power and the beam stability may be enhanced.

Furthermore, when the light pumping module is the integral type, the bar having a relatively low thermal expansion coefficient may be used in integrally modulating the light pumping module. Accordingly, the mechanical deformation generated by the temperature change may be reduced as much as possible advantageously.

BRIEF DESCRIPTION OF THE DRAWINGS

FIG. 1 is a schematic diagram illustrating a femtosecond laser;

FIG. 2A is a front view illustrating the light pumping units (LPU) having the conventional optical mounts coupled thereto independently;

FIG. 2B is a plane view illustrating the light pumping units (LPU) having the conventional optical mounts coupled thereto independently;

FIG. 3 is a graph illustrating change in powers according to the time when an operation of femtosecond lasers in which conventional optical mounts are independently mounted thereto, respectively, starts to operate;

DETAILED DESCRIPTION

Referring to the accompanying drawings, embodiments of the present invention will be described in detail as follows.

Figure 4A:
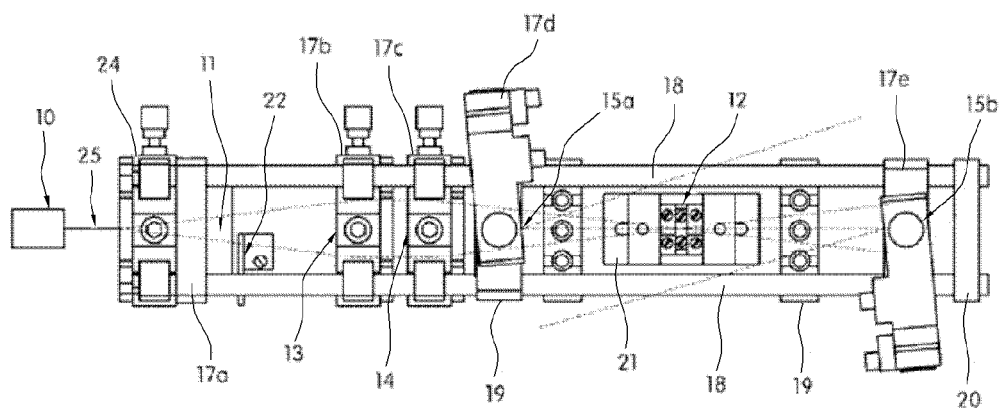
FIG. 4A is a front view illustrating the light pumping units in which the optical mounts are integrally modulated.
Figure 4B:
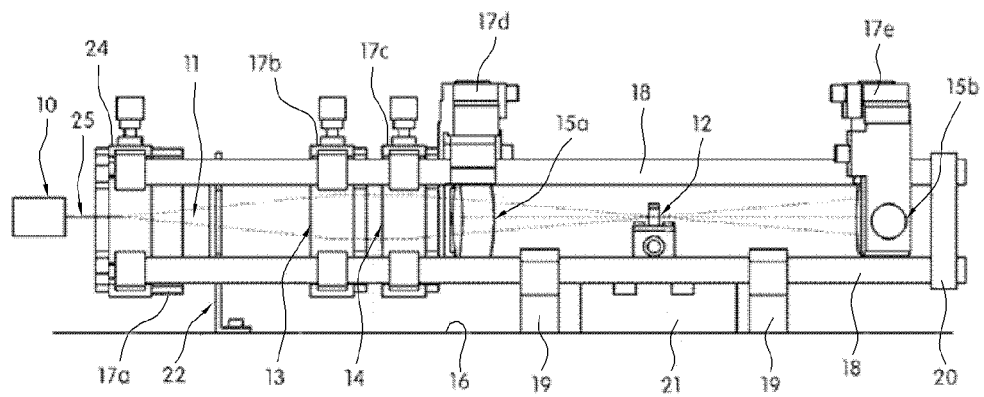
FIG. 4B is a plane view illustrating the light pumping units in which the optical mounts are integrally modulated.

FIGS. 4A and 4B are a diagram illustrating the light pumping units in which optical mounts are integrally modulated according to one embodiment of the present invention. FIG. 4A is a front view illustrating the light pumping units in which the optical mounts are integrally modulated and FIG. 4B is a plane view illustrating the light pumping units in which the optical mounts are integrally modulated.

As shown in FIGS. 4A and 4B, the femtosecond laser apparatus according to the present invention include a light pumping module. The light pumping module is integrally configured of optical components for diode pumping and mounts for mounting the optical components that are integrally modulated by a bar having a lower thermal expansion coefficient, namely, a module coupling bar 18 and a least number of module couplers 19 such the light pumping module is installed distant from a laser platform 16, for example, spaced apart a predetermined distance (height) from the laser platform 16.

For that, there may be provided a laser diode 10 for light pumping, a half-wave plate 11 for controlling a polarizing direction of a pumping light, a collimating lens 13 and a focusing lens 14 for applying a beam output from the laser diode 10 to a laser material 12 efficiently and for enhancing mode coupling, a laser material 12 in which the pumping lights are focused and dichroic mirrors 15a and 15b for reflecting a laser beam and transmitting the pumping light. Out of such optical components, the half-wave plate 11, the collimating lens 13 and the focusing lens 14 and the laser material 12 are arranged in a line. The dichroic mirrors 15a and 15b are arranged in right and left sides of the laser material 12.

Especially, the optical components, for example, the half-wave plate 11, the collimating lens 13, the focusing lens 14 and the dichroic mirrors 15a and 15b are supportedly mounted on mounts 17a~17e, respectively. At this time, the mounts 17a~17e are integrally coupled to each other by one module coupling bar 18, preferably, two to fourth module coupling bars 18.

A module coupling bar is not affected by external physical vibration. When the laser beam is focused on a target, the module coupling bar is configured to enhance alignment between the optical components to make the laser beams emitted in a desired direction.

Moreover, the module coupling bar is configured to compensate an alignment degrading characteristic between the optical components by the thermal distortion of each mount generated when the pumping lights passing the optical components are absorbed in the mounts mounting the optical components. Such the module coupling bar 18 is coupled while horizontally passing the mounts 17a~17e simultaneously, such that the entire mounts 17a~17e including the optical components can be integrally coupled to each other.

At this time, the module coupling bar 18 may be formed of a predetermined material having a lower thermal expansion coefficient than a material used in forming the optical component mounts. The module coupling bar may include INVAR, Super-INVAR and KOVAR and the optical component mount may include aluminum, stainless and yellow brass.

The overall module coupling bar 18 having the optical components and the mounts 17a~17e may be supportedly coupled on the module coupler 19 installed on the laser platform 16.

The module coupler may be formed of aluminum, stainless, copper or brass. The laser platform may be formed of aluminum or stainless.

In the present invention, the module coupling bar for enhancing the alignment characteristics of the optical components may be used. Each of the optical components is integrally coupled to one case to couple the optical components to the case, such that one light pumping module may be formed.

Figure 6:
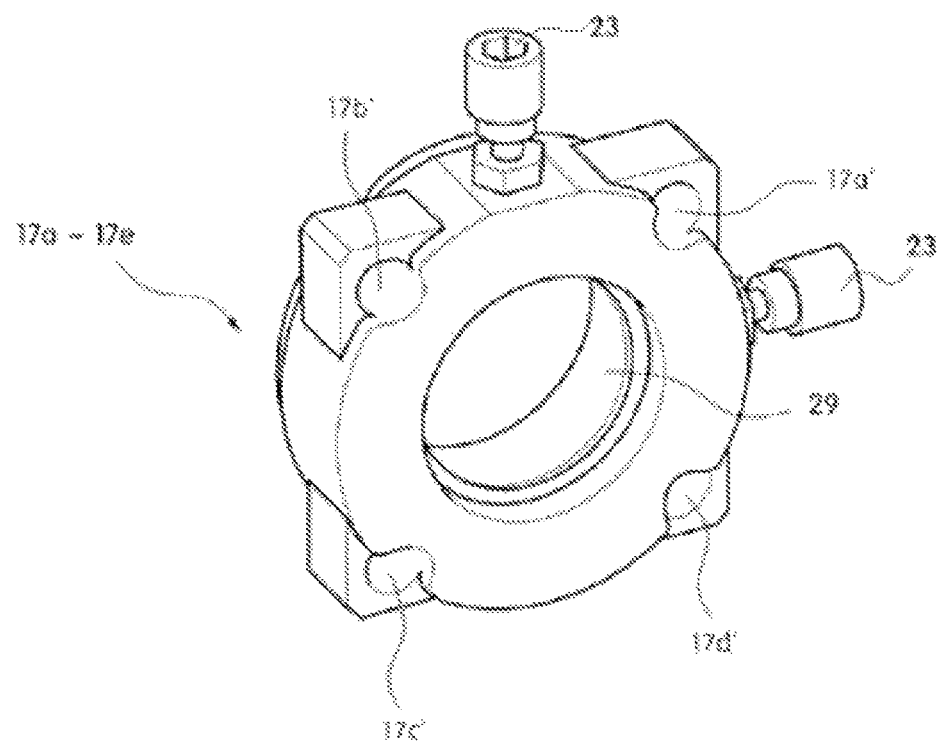
FIG. 6 is a perspective view a coupling type of an optical mount provided in the light pumping units having the optical mounts integrally modulated therein according to one embodiment of the present invention.

As shown in FIG. 6, the mounts 17a~17e may be arranged in a annular shape, with an optical component seating part 29 for seating the optical components thereon and a position adjusting screw 23 for precisely adjusting the positions of the optical components seated on the optical component seating part 29. Two to four holes 17a'~17d' are provided in each of the mounts 17a~17e to pass the module coupling bar 18 there through.

Figure 5:
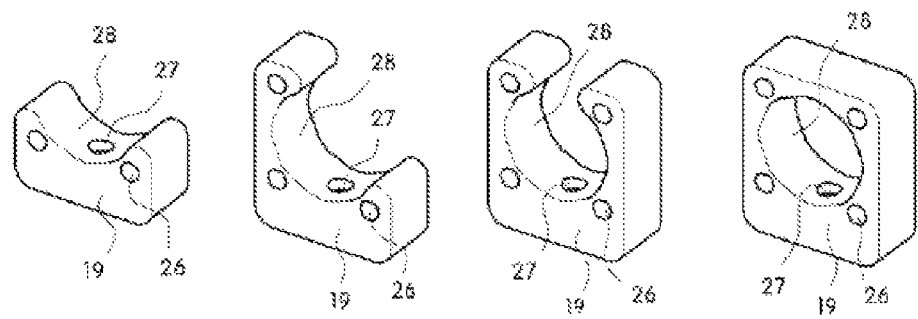
FIG. 5 is a perspective diagram illustrating various module couplers provided in the light pumping units having the optical mounts integrally modulated therein according to one embodiment of the present invention.

Also, the module coupler 19 may be formed in various shapes. As shown in FIG. 5, the module coupler 19 may include an open type or closed type mount seating part 29 and two to fourth penetrating holes 26 to pass the module coupling bar 18 there through. Specifically, in case the module coupler includes an open type mount seating part described in the first structure, a traveling direction of the pumping light generated from the laser diode or the laser beam generated via the laser material may not be interfered with. Also, in case the mount seating part is a closed type described in the fourth structure, the structural stability of the light pumping module can be provided.

Here, 27 of a numeral reference with no description refers to a screw hole used when the module coupler 19 is coupled on the laser platform 16.

Such the light pumping module in which the optical components are focused toward a front end could be in asymmetry. To solve such asymmetry and to stabilize the light pumping module entirely, an auxiliary adapter 20 is provided and the auxiliary adapter 20 may be coupled to an end of the module coupling bar 18 that is opposite to the half-wave plate 11 by a screw.

In one embodiment, the auxiliary adapter is arranged in opposite to the half-wave plate. Optionally, the position of the auxiliary adapter is changeable based on the structure of the light pumping module.

The laser material 12 arranged between the dichroic mirrors 15a and 15b is directly mounted on the laser platform 16 by the laser material mount 21.

In other words, the laser material 12 is by the laser material mount 21 directly installed on the laser platform 16, not by the module coupling bar 18.

Figure 7:
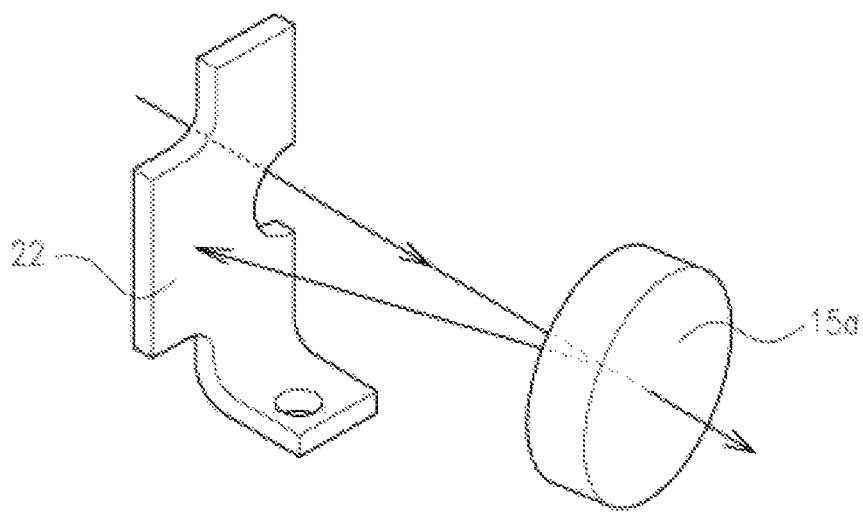
FIG. 7 is a perspective diagram illustrating a reflection beam blocker provided in the light pumping units having the optical mounts integrally modulated therein according to one embodiment of the present invention.

As shown in FIG. 7, a reflection beam blocker 22 is positioned in a rear end of the half-wave plate 11. At this time, the reflection beam blocker 22 is configured to prevent one mount 15a having the half-wave plate 11 mounted therein from being heated by the beam having the strong intensity reflected by one dichroic mirror 15a. Such the reflection beam blocker 22 is installed on the laser platform 16. Accordingly, even if thermal deformation of the reflection beam blocker is generated by the pumping light reflected by the dichroic mirror, such thermal deformation may not affect the light pumping module and the heat inside the reflection beam blocker is also transmitted to the laser platform not to affect the alignment of the light pumping module.

Especially, the optical fiber 25 extended from the laser diode 10 is connected to the half-wave plate 11. At this time, one end of the optical fiber 25 is supportedly connected to an optical fiber mount 24 coupled to the module coupling bar 18.

<Best Mode>

A laser material used in this experiment is doped with 5% of Ytterbium-ion ($Yb^{3+}$) and Yb:KYW Laser Crystal (LC) having a size of 3×3×3 $mm^3$ is used for the laser material.

Yb:KYW is anisotropic laser material and has a predetermined absorbancy that can be different according to a traveling direction or a polarizing direction of a pumping light.

To maximize the absorbancy of the pumping light, the polarizing direction of the pumping light is parallel to a-axis of the laser material and the laser material is cut away to make the pumping light travel in b-axis. Also, non-reflection coating is performed on both surfaces of the laser material to reduce reflection with respect to the wavelength of the pumping light and the wavelength of the laser as much as possible.

A concave dichroic mirror (DM) having a curvature of 100 mm is arranged and the concave dichroic mirror reflects the laser beam and transmits the pumping light.

The dispersion generated from the optical components composing the laser resonance capacity has to be compensated to generate a pulse shorter than 1 picosecond from a femtosecond laser resonance capacity.

Typically, a prism delay line or a chirped reflection mirror is used. Dispersion compensation is enabled by a variation of a distance between the optical components but by a variation of the chirped reflection mirror in the chirped reflection mirror, different from the prism delay line using a pair of prisms. Accordingly, the femtosecond laser can be configured compactly.

At this time, an overall group speed dispersion is GVD=−1350 $fs^2$ when passing two chirped reflection mirrors used in the resonance capacity.

A semiconductor saturable absorber mirror (SAM) is positioned one end of the laser resonance capacity to convert a femtosecond laser oscillated as a continuous wave into a laser capable of generating the mode-locked femtosecond pulse.

Beams are focused on a surface of the semiconductor saturale absorber mirror by a concave reflection mirror having a curvature of 300 mm to achieve an intensity that is higher than a saturable intensity of an absorber.

At this time, an absorbance of the semiconductor saturable absorber is 3%.

A laser diode (LD) having the maximum output of 8 W is used as the pumping light source.

The laser diode is mounted in a copper block in which Feltier thermoelectric module is mounted and the temperature of the copper block is controlled to be uniform by a cooler configured to circulate cold water having a uniform temperature.

The temperature of the laser diode is controlled to generate a wavelength at which absorption of the pumping light source is the maximum in the laser material.

To enhance pumping efficiency, the length of the optical fiber coupled to the laser diode is 80~120 mm, preferably, 100 mm that is short, to get the linearly polarized beam having a polarization separation level of 7%, Beams output from a high power laser diode in which an optical fiber having an numerical aperture of 0.11 and a core diameter may be 100~110 μm, preferably, 105 μm is coupled are applied to the laser material efficiently. To enhance mode coupling, a collimating lens (CL) and a focusing lens (FL), of which focusing distances are 60 mm, are used optimally.

At this time, a diameter of a traverse direction beam focused on the laser material from the pumping light source may be approximately 100 μm which is fitted to the size of the resonance mode created in the laser material.

The absorbance of the pumping light source in the laser material is differentiated according to a polarizing direction of the pumping light source. Before that, the half-wave pate (WP) mounted on a rotation mount is arranged next to one end of the optical fiber to precisely adjust the polarizing direction of the pumping light source so as to make the light pumping efficiency be the maximum.

In this experiment, the light pumping unit consists of one end of a laser diode, a half-wave plate (WP), a collimating lens (CL), a focusing lens (FL), a dichroic mirror (DM) and a reflection mirror (M3).

(a) and (b) of FIG. 2 show that optical mounts having optical components composing the light pumping unit coupled thereto are mounted to a laser platform, respectively. FIG. 4 shows that mounts having the optical components composing the light pumping unit coupled thereto are mechanically coupled by a module coupling bar.

As shown in FIG. 4, in case the mount module is configured by the mechanical coupling, a module coupler is fabricated to couple the module coupling bar to the mount module to make the mount module be independent from mechanical deformation generated outside or inside the laser platform. The module coupler is mounted to the module coupling bar as shown in FIG. 5.

The module coupler is a mechanism configured to connect the integral type light pumping module to the laser platform. The number of the module couplers may be as small as possible, considering the thermal stability of the light pumping module.

According to this embodiment, two module couplers are used as shown in FIG. 4.

in this embodiment, a coupling type mount for the end of the laser diode, a coupling type mount for the half-wave plate, a coupling type mount for the collimating lens, a coupling type mount for the focusing lens, a coupling type mount for the dichroic mirror and a coupling type mount for the reflection mirror.

The integral type light pumping modules may be arranged in asymmetry with respect to the laser resonance capacity. An auxiliary adapter is arranged in the other end of the laser diode to stabilize the alignment of the integral type light pumping modules.

Here, a large amount of diode pumping beams may be absorbed in the laser material and a predetermined amount of the other diode pumping beams may be transmitted to the laser material mount as heat, not absorbed in the laser material, such that the laser material mount may be separated from the light pumping module to be directly mounted to the laser platform.

In other words, the laser material mount may be coupled to the module coupling bar as an element composing the light pumping module. However, the thermal energy generated in the laser material is relatively large and the laser material mount may be directly mounted to the laser platform, such that the thermal deformation of the light pumping module may be minimized.

Moreover, cold water cooled to have a predetermined temperature by a cooler may flow to the laser material mount.

The high intensity pumping light is reflected by the dichroic reflection mirror provided in the resonance capacity of the laser to contact with the coupling type mount of the half-wave plate such that the coupling type mount for the half-wave plate can be heated locally to generate thermal deformation. Accordingly, the mechanical stability of the light pumping module might be deteriorated.

To prevent that, a reflection beam blocker 22 shown in FIG. 7 may be fabricated additionally and the reflection beam blocker is directly coupled to the laser platform, not to the light pumping module. Alternatively, the reflection beam blocker may be directly coupled to the light pumping module.

Therefore, the present invention may provide the light pumping module configured of the mounts for the optical components of the diode pumping unit which are mechanically coupled to each other by the bar having a low thermal expansion coefficient, to provide a stabilized mode locking in the ultrashort laser and to enhance the output stability and the beam stability. Such the light pumping module is arranged distant from one surface of the laser platform or the case.

More specifically, the mounts mechanically deformed by local heating of the strong intensity pumping light sources may be mechanically coupled to each other to be an integral type module. Meanwhile, the modulating method uses INVAR that has a mechanical thermal expansion coefficient of approximately zero with respect to temperature change.

The contact between the module and the laser platform or the case is minimized to minimize the external thermal deformation transmitted to the module.

The light pumping module is strongly and mechanically stabilized even with temperature change and the mode coupling between the pumping light sources focused on the laser material and the laser resonance mode may be maintained stably, only to enhance the output stability and the beam stability.

The effects of such the light pumping module will be described as follows.

A full reflection mirror is arranged in a position in which the semiconductor saturable absorber is supposed to be positioned to oscillate the laser in a continuous wave to oscillate the femtosecond laser. The optical alignment of the lasers is optimized and the full reflection mirror is replaced by the semiconductor saturable absorber to oscillate the femtosecond pulse and then the mode locking is generated.

The femtosecond pulse is operated at a repetition ratio of 87.8 MHz and the energy per one pulse is 10 nanojoule or more, with an average power of approximately 1 W.

In FIGS. 8 to 12, the output characteristic of the femtosecond pulse is measured in a state where the thermal deformation is reduced by integrally modulating the light pumping units in the femtosecond laser.

Figure 8:
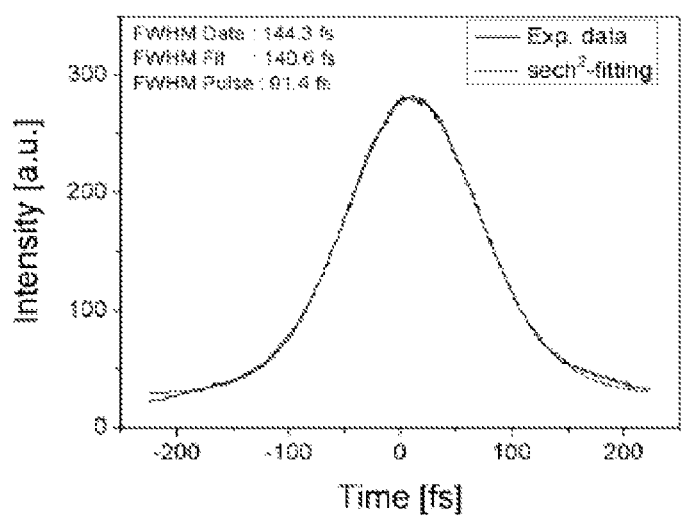
FIG. 8 is a graph illustrating a characteristic (a pulse width) of a femtosecond pulse according to one embodiment of the present invention.
Figure 9:
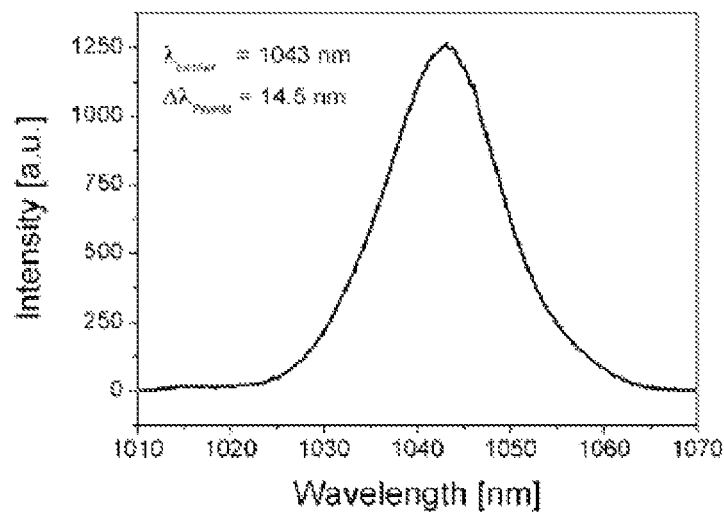
FIG. 9 is a graph illustrating a characteristic (a spectrum) of the femtosecond pulse according to one embodiment of the present invention.

FIG. 8 shows that the time width of the femtosecond laser pulse is measured and a full width at a half maximum (FWHM) is 91.4 femtosecond. At this time, a full width at a half maximum with respect to a spectrum of 1043 nanometers as shown in FIG. 9.

A value gained by multiplying a pulse width to a bandwidth ($\Delta\upsilon * \Delta\tau$) that shows a characteristic of the femtosecond pulse is 0.372.

In case the femtosecond pulse forms a hyperbolic function of sech2, the value gained after multiplication is 0.315.

Figure 10:
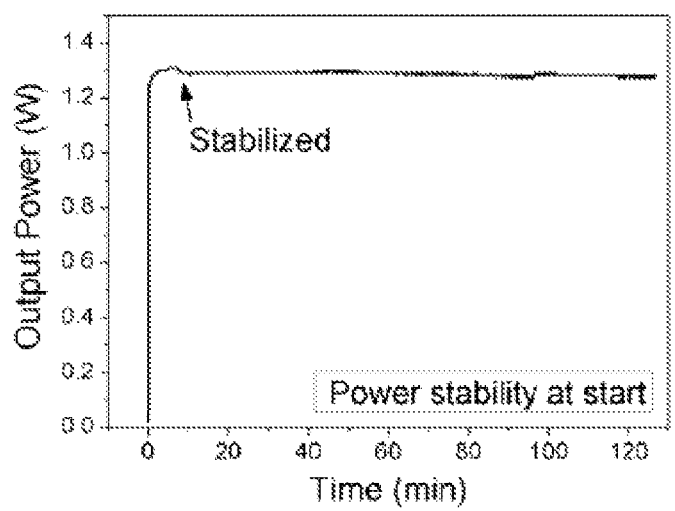
FIG. 10 is a graph illustrating change in powers according to the time the operation of femtosecond lasers in which the conventional optical mounts are independently mounted thereto, respectively, starts to operate.

FIG. 10 shows change in powers based on the time when a laser operation starts in a femtosecond laser in which a light pumping module configured of mounts composing a light pumping unit integrally modulated by a module coupling bar.

Similar to the embodiment of FIG. 3, the embodiment of FIG. 10 shows that a laser operated to operate a femtosecond laser pulse stably and that the laser power is on again after the laser turned off is completely cooled.

The result of the experiment performed to realize the embodiment of FIG. 10 shows that the laser is operated very stably in case of using the integrally modulated light pumping unit, which is different from the result of FIG. 3 having the mounts independently provided.

In case of FIG. 3, the mode locking is broken and the mode locking starter has to be operated. However, in case of FIG. 10, the mode locking is stabilized and maintained within several minutes even when the power is turned on again.

It is shown in FIG. 10 that change in powers based on the time is stabilized, compared with what is shown in FIG. 3.

The integral type light pumping module realized in the experiment of the present invention realize light pumping in a vertical direction with respect to the laser material by using one laser diode.

By extension, two laser diodes may be applied to the laser material in symmetrically different direction.

In this instance, one light pumping unit is configured as a module for pumping lights and two light pumping modules are arranged in both sides of the laser material. Alternatively, a longer module coupling bar is used and two light pumping units configurate one light pumping module.

A module coupler may be additionally arranged for mechanical stability with respect to a laser platform.

Alternatively, even in case two or more laser materials configurate a laser, the number of the light pumping modules can be increased or the integral type light pumping module can be expanded.

The stability of the femtosecond laser beam is measured more specifically in the experiment of the present invention.

The beam stability may be classified into a beam position stability and a beam angle stability.

The beam position stability shows how much changed is the beam positioned on a surface where a target of the beam is positioned.

The beam position stability is important as an indicator showing how precisely a projected laser beam hits the target in case where the target is positioned distant from the laser.

The beam angle stability shows how changes a direction of focused beams in case where small-sized laser beams are focused by using a lens having a short focal distance.

The beam angle stability is important as an indicator that affects precision of the laser processing result in case a high intensity beam such as a processed laser is focused on a metallic or non-metallic processed material.

A center of the laser beam is defined as a centroid of a power density distribution or a first spatial moment.

Z-axis that is a traveling direction of the beam forms a line connecting two centroids measured in two planes of homogenous materials simultaneously. At this time, the beam stability includes a beam stability showing displacements in a traverse direction of x-axis and y-axis with respect to z-axis of a beam travelling direction and a beam angle stability showing angle variations.

A beam profiler in which CCD is mounted is arranged apart a distance of 1000 mm from the laser and change in beam centroids is measured to show a relative beam position stability ($\Delta$rel) from a beam diameter (D) and a position standard deviation ($\Sigma$) ($\Delta$rel=2$\Sigma$/D).

A lens having a focal length of 12 mm is arranged in a position spaced apart a distance of 750 mm from the laser and a beam profiler in which CCD is mounted is arranged in a light-focused position. After that, change in beam ncentroids is measured and a relative beam pointing stability ($\delta$ rel) is gained from a beam diameter (d) and a position standard deviation ($\sigma$) based on the change ($\delta$ rel=2$\sigma$/d).

Figure 11:
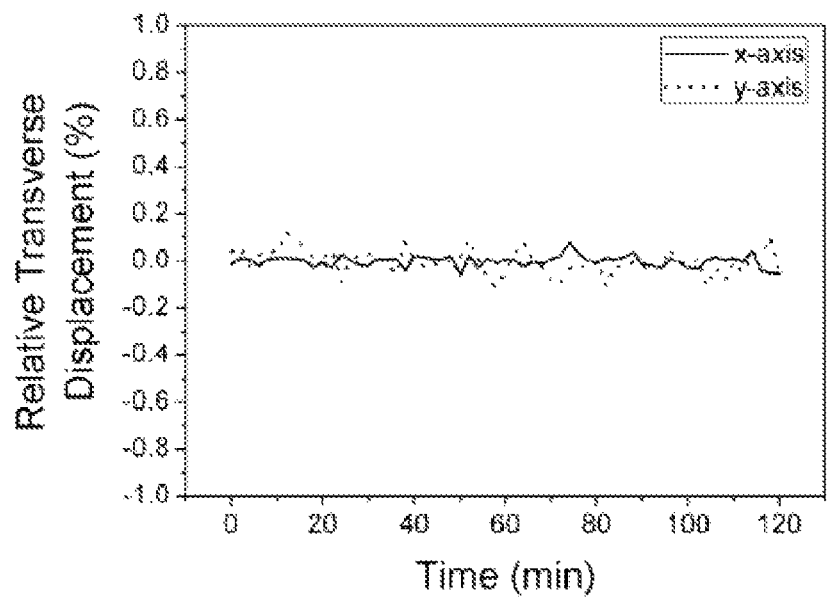
FIG. 11 is a graph illustrating change in relative positions of beams based on the time according to one embodiment of the present invention.

FIG. 11 shows the result of an experiment measuring change in relatively beam positions based on the time, in other words, the beam position stability. It is shown that the beam position stability is smaller than 0.1%.

That is, change in the beam positions distant from the laser is within 0.1% of the beam size.

Figure 12:
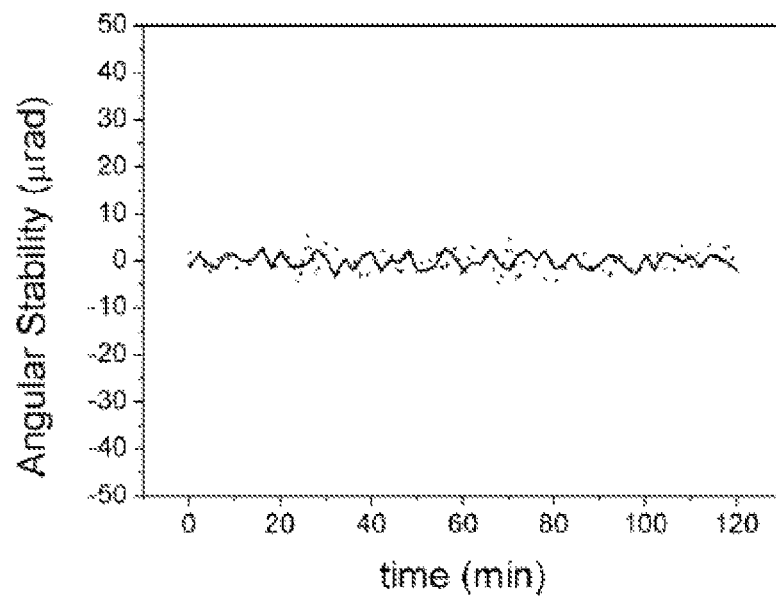
FIG. 12 is a graph illustrating change in beam angles based on the time according to one embodiment of the present invention.

FIG. 12 shows the result of an experiment for measuring change in beam angles according to the time, in other words, the beam angle stability. The beam angle stability is very low, approximately 0.4 μrad in x-axis direction and approximately 0.7 μrad in y-axis direction.

Considering that a commercial laser having a good beam angle stability of 2~5 μrad, the result of the experiment performed to realize the embodiment of the present invention is quite excellent.

Figure 13:
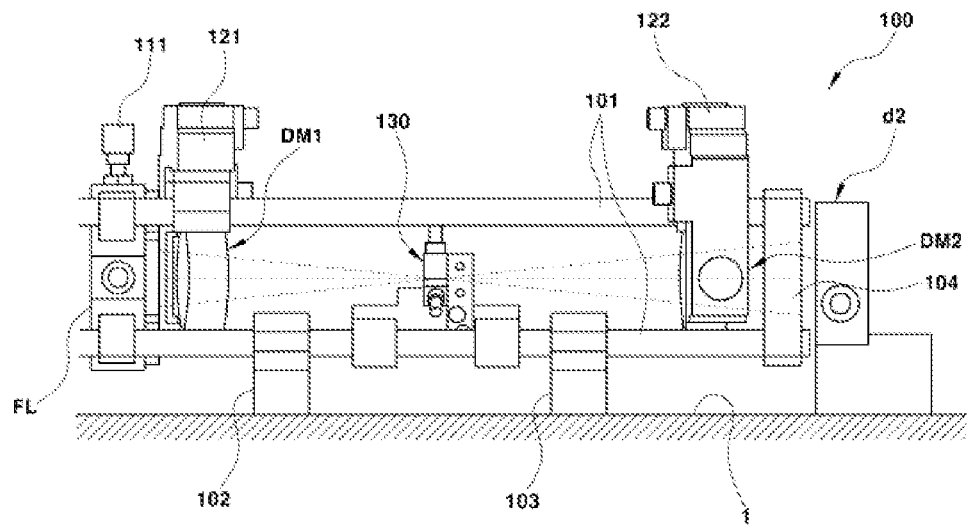
FIG. 13 is a front diagram illustrating a light pumping unit in which optical mounts having laser material mounts are integrally modulated according to another embodiment of the present invention.
Figure 14:
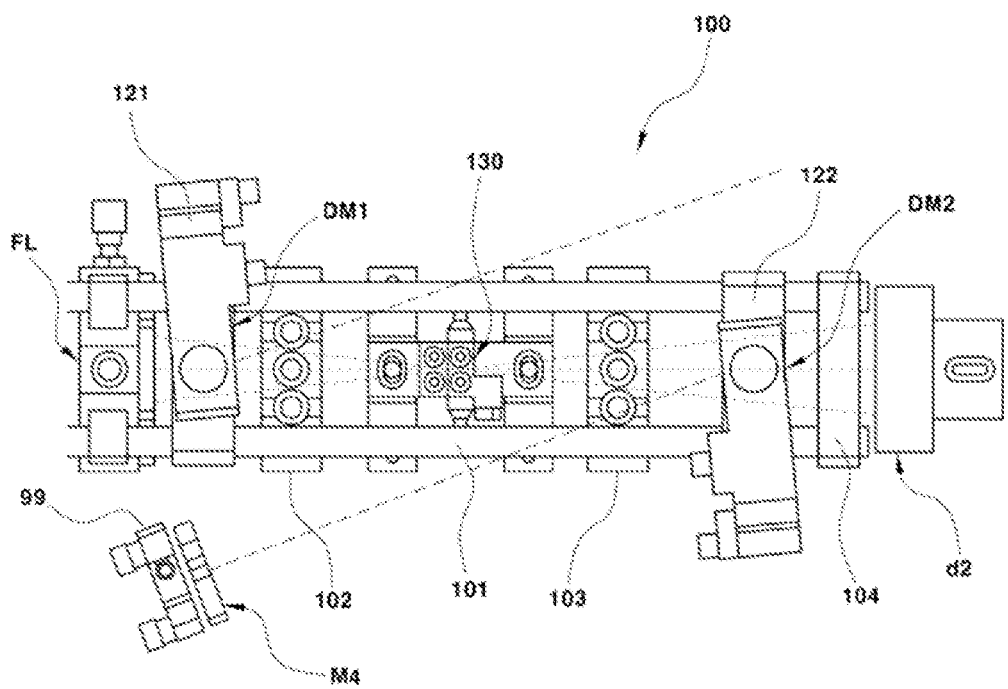
FIG. 14 is a plane diagram of the light pumping unit shown in FIG. 13.

FIG. 13 is a front diagram illustrating a light pumping unit in which optical mounts having laser material mounts are integrally modulated according to another embodiment of the present invention. FIG. 14 is a plane diagram of the light pumping unit shown in FIG. 13.

In the embodiment of the present invention shown in FIG. 13, motion and rotation of a laser material in the other directions except an optical axis direction is restricted when a position of a laser material is optimized to enhance a laser power, so as to adjust the position of the laser material, without affecting the laser wavelength or the distortion of the beam shape.

Referring to FIGS. 13 and 14, a light pumping module 100 includes a focusing leas mount 111, a focusing lens (FL), dichroic mirror mounts 121 and 122, dichroic mirrors (DM1 and DM2), a module coupling bar 101, a laser material assembly 130 having a laser material and a transmissive beam blocker (d2). Although not shown in the drawing, a half-wave plate for adjusting a polarizing direction of a pumping light and a collimating lens for applying a beam output from a laser diode to enhance mode coupling may be provided.

The half-wave plate and the collimating lens are integrally formed with the focusing lens (FL), the dichroic mirrors (DM1 and DM2) and the laser material assembly 130 via the module coupling bar 101.

Such the light pumping module 100 optical components composing a diode pumping unit and mounts for mounting the optical components. The light pumping module 100 is spaced apart a predetermined distance (height) from a laser platform 1.

Specifically, the optical components composing the light pumping module, in other words, the focusing lens (FL) and the dichroic mirrors (D1 and D2) and the laser material (LC shown in FIGS. 15 and 18) may be supportedly mounted to the mounts, in other words, the focusing lens mount 111, the dichroic mirror mounts 121 and 122 and the laser material mount (not shown), respectively. The mounts (111, 121 and 122 are integrally coupled to each other by at least one module coupling bar 101, preferably, two to four module coupling bars 101.

Specifically, the module coupling bar 101 couples the mounts 111, 121 and 122 for the optical components and the laser material mount to each other, with horizontally passing there through, such that the entire mounts of the light pumping module 100 may be integrally coupled to each other by the module coupling bar 101.

Here, the laser material mount includes connecting blocks 132 and 133 and supporting blocks 134 which will be described later. Those blocks are shown in FIGS. 15 to 18.

The laser material assembly 130 including the laser material (LC) and the laser material mount is coupled to the module by the module coupling bar 101 and the light pumping module 100 may be the integral type module 100 integrally coupled to the other components.

In other words, the laser material is coupled to the module coupling bar 101, not installed on the laser platform 1, such that it may be integrated and modulated with the other components via the module coupling bar 101. Accordingly, the laser material assembly 130 may be movable along a longitudinal direction of the module coupling bar 101, that is, an optical axis direction.

At this time, INVAR, Super-INVAR and KOVAR that have a low thermal expansion coefficient may be applied to the module coupling bar 101.

Moreover, the overall module coupling bar 101 is supportedly coupled to one or more module couplers 102 and 103 installed on the laser platform 1. The module couplers 102 and 103 are fastened to a top surface of the laser platform 1 by a bolt or screw.

The auxiliary adapter 104 may be mounted on the module coupling bar 101 to stabilize the light pumping module 100, with no tilting, and it may be mounted to an end of the module coupling bar 101 by a screw fastening structure.

Meanwhile, a numeral reference of 'M4' is a resonance mirror and this resonance mirror is supportedly mounted on a resonance mount 99 fixed on the laser platform.

If a conventional resonance mirror is mounted on a dichroic mirror mount 122 in the light pumping module 100, not only a resonance mode but also a pumping light can be reflected by the conventional mirror. Such a reflected pumping light might heat a mount 99 for the resonance mirror (M4) and be a factor making the laser be unstable.

Accordingly, a dichroic mirror is mounted on the dichroic mirror mount 122, instead of the conventional mirror, to reflect the resonance mode and to transmit the pumping light. At this time, a transmissive beam block (d2) is installed in an end of the light pumping module 100 to be positioned behind the dichroic mirror (DM2), such that the light having transmitted the dichroic mirror (DM2) can be absorbed into the transmissive beam block (d2).

At this time, the transmissive beam blocker (d2) may have a cooling block to pass cold water to pass there through. In case the pumping beam is so highly intensive to make the transmitted light heat the transmissive beam blocker, the cold water may flow to cool the transmissive beam blocker.

Although not shown in the drawings, the laser material assembly 130 may further include cooling means for cooling the laser material. Methods for cooling the laser material assembly may include a water cooling system. Cooling means of such a water cooling system may be structured to circulate a preset temperature cold water there through so as to control the temperature of the laser material uniformly.

Referring to FIGS. 15 to 18, the laser material assembly configured of the laser material, the mounts and the water cooling type cooling means will be described in detail as follows.

Figure 15:
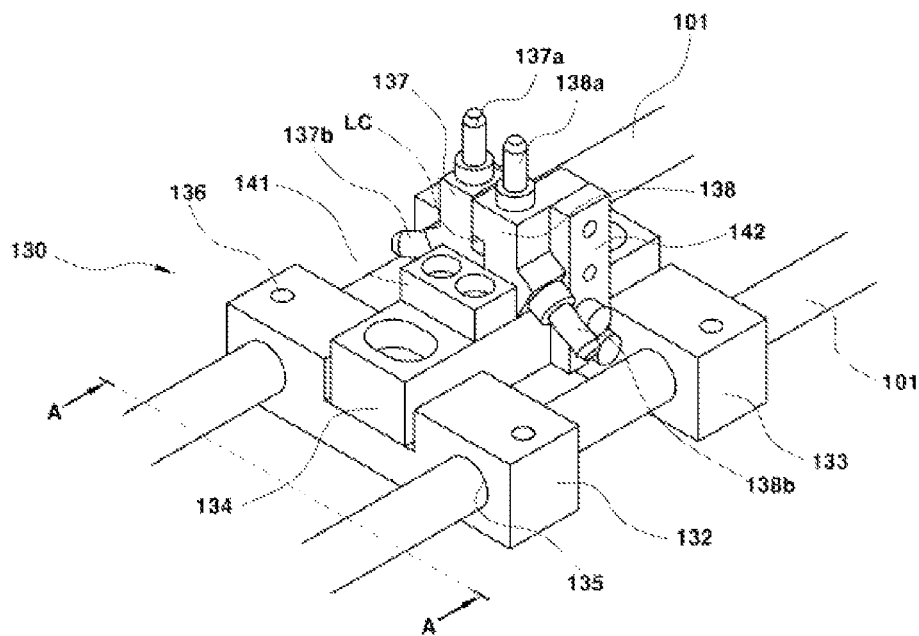
FIG. 15 is a perspective diagram illustrating a laser material assembly provided in the light pumping module according to one embodiment of the present invention.
Figure 16:
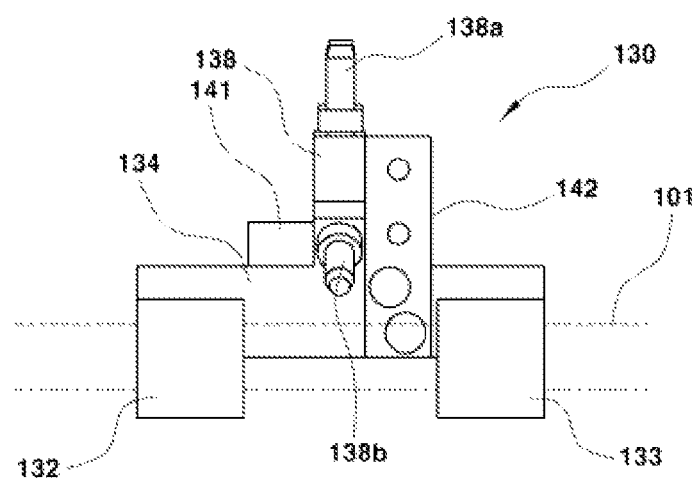
FIG. 16 is a front view of the laser material assembly shown in FIG. 15.
Figure 17:
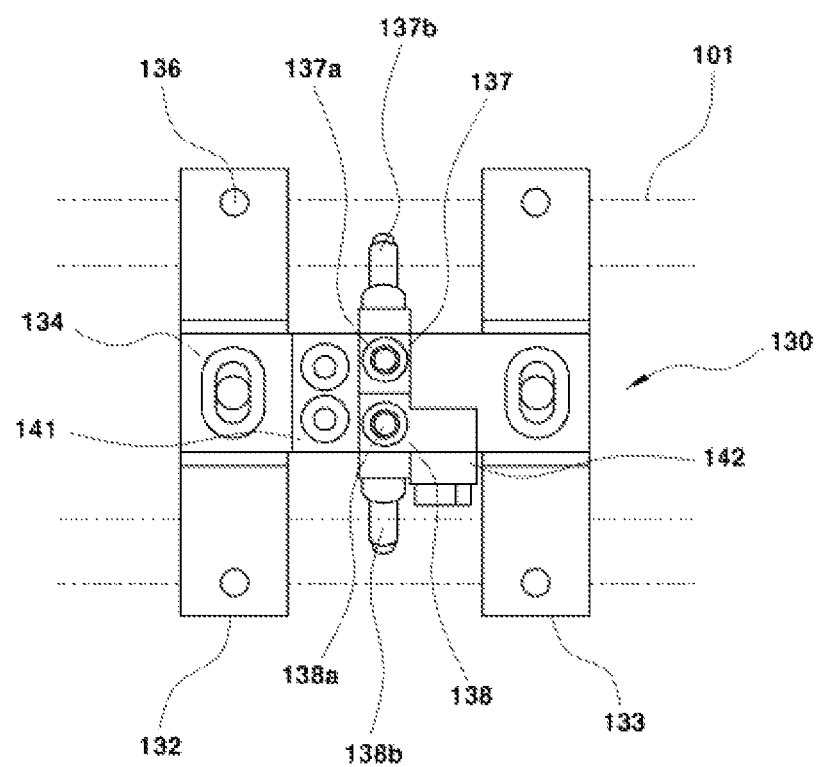
FIG. 17 is a plane diagram of the laser material assembly shown in FIG. 15.

FIG. 15 is a perspective diagram illustrating a laser material assembly provided in the light pumping module according to one embodiment of the present invention. FIG. 16 is a front view of the laser material assembly shown in FIG. 15. FIG. 17 is a plane diagram of the laser material assembly shown in FIG. 15.

Referring to FIGS. 15 to 18, the laser material mount is a component for supporting the laser material (LC) in a state of being coupled to the module coupling bar 101. The laser material mount includes connecting blocks 132 and 133 having the module coupling bar 101 substantially and connectedly passing there through, and a supporting block 134 fixed to the connecting blocks 132 and 133 to support the laser material (LC).

The connecting blocks 132 and 133 is structured to have a hole 135 the module coupling bar 101 can connectedly pass through and the connecting blocks 132 and 133 may be coupled to the module coupling bar 101 via the hole 135.

The positions of the connecting blocks 132 and 133 are adjusted on the module coupling bar 101 along an axial direction back and forth, before it is fixed. Bolts or screws may be inserted in a plurality coupling holes 136 formed in the connecting blocks 132 and 133, respectively, and then the bolts or screw are tightened to press the module coupling bar 101, such that the positions of the connecting blocks 132 and 133 can be fixed on the module coupling bar 101.

The supporting block 134 is fixedly fastened on the connecting blocks 132 and 133 by fastening means such as a bolt or screw. On the supporting block 134 may be connected a first cooling block 137 and a second cooling block 138 to pass cold water there through as cooling means of the laser material assembly 130.

In other words, two blocks fabricated to have a structure to pass cold water through an internal space thereof, specifically, the first cooling block 137 and the second cooling block 138 may be installed on the supporting block 134. Those first and second cooling blocks 137 and 138 are fixed on the supporting block 134 by a fixing block 141 and a coupling block 142.

The fixing block 141 is a block integrally fixed to the first cooling block 137 and it is fastened on the supporting block 134 by a bolt or screw, such that the position of the first cooling block 137 integrally formed with the fixing block 141 may be fixed.

The coupling block 142 may be disposed to connect the supporting block 134 and the second cooling block 138 with each other, to integrally fix the supporting block 134 to the second cooling block 138. The coupling block 142 may be fastened to the supporting block 134 and the second cooling block 138 by a bolt or screw.

A port is provided in each of the first and second cooling blocks 137 and 138 to lead in or out the cold water. A cold water inlet hose is connected to inlet ports 137b and 138a of the blocks to supply cold water to the blocks. A cold water outlet hose is connected to outlet ports 137a and 138b of the blocks.

Figure 18:
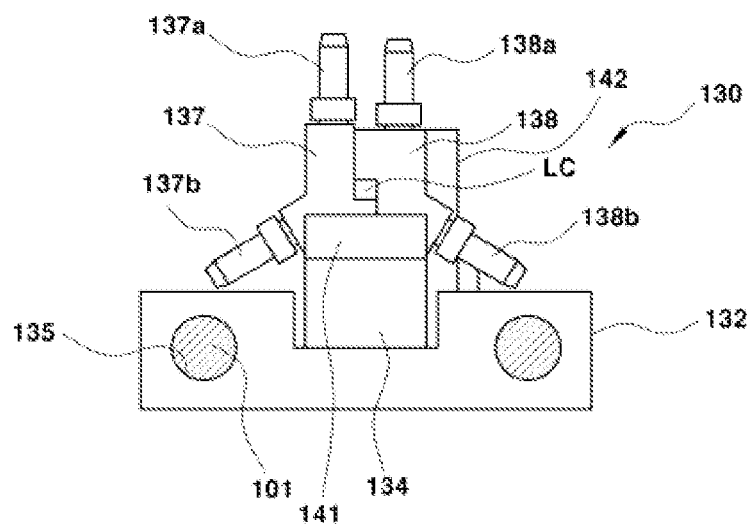
FIG. 18 is a side view along a line of 'A-A' shown in FIG. 15.

In addition, the first cooling block 137 and the second cooling block 138 are employed to fix the laser material (LC) stably. As shown in FIGS. 15 and 18, the two cooling blocks 137 and 138 are fabricated to have the structure capable of surrounding the laser material (LC), in a state of connected with each other.

In other words, the first cooling block 137 and the second cooling block 138 are fixedly connected with each other on the laser material (LC) and the laser material (LC) is coupled between the two cooling blocks in that state, such that the portion the laser material is substantially coupled to may be the two cooling blocks.

Accordingly, in the laser material assembly 130, the cooling blocks 137 and 138 are mounted on the laser material mount including the connecting blocks 132 and 133 and the supporting block 134 and the laser material (LC) is coupled to the cooling blocks 137 and 138, such that the laser material (LC) may be structurally and stably mounted on the laser material mount.

Meanwhile, in the embodiment of FIGS. 15 to 18, the coupling position of the laser material assembly 130 may be adjusted in the axial direction of the module coupling bar 101 such that the position of the laser material (LC) can be adjusted in an optical axial direction.

In other words, after the bolt or screw fastened to the module coupling bar 101 is loosened from the connecting blocks 132 and 133 of the laser material mount, the position of the overall laser material assembly 130 including the connecting blocks 132 and 133 and the laser material (LC) is adjusted and then the bolt or screw is tightened again to fix the connecting blocks 132 and 133 on the module coupling bar 101.

Figure 19:
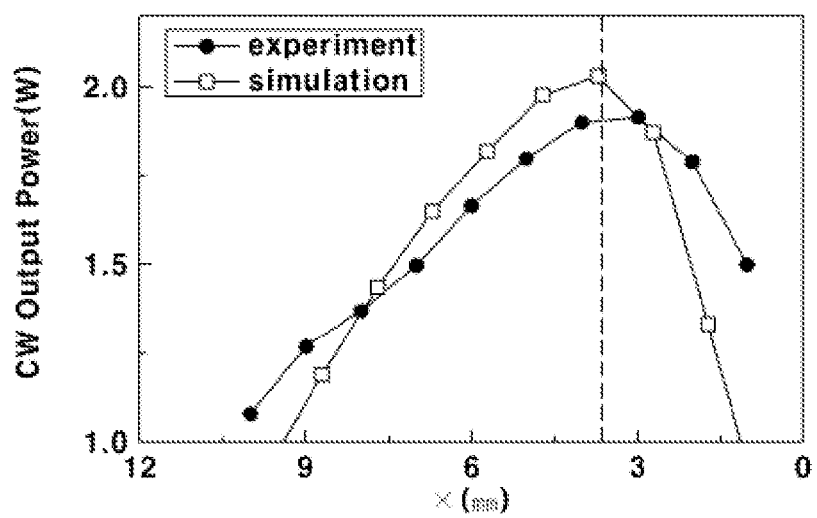
FIG. 19 is a graph illustrating a characteristic of a laser power according to a position of the laser material.

FIG. 19 shows data measured by LASCAD computer simulation and experiments on how changes the power substantially output from the laser, when the position of the laser material is moved.

Referring to the graph of FIG. 19, a laser output value may be increased more, when the position of the laser material is appropriately distant from a position at which the distribution of the resonance mode has the minimum radius, and decreased again when the position is farther.

The efficiency of the femtosecond laser system is highly sensitive to the position of the laser material. In case of the anisotropic laser material, it is highly important to precisely adjust and optimize the position of the laser material so as to gain the highest beam quality and the maximum power efficiency of the beam.

When mounting the conventional laser material, an auxiliary mount is provided to mount the laser material in the laser case, regardless of the light pumping unit.

Even in case the light pumping unit is an integrated type, the laser material is mounted on the mount independent from the other optical mounts to fix it to the laser platform in the integral type system having the light pumping unit shown a dotted line of FIG. 1.

In this instance, when the laser material is moved for the efficiency enhancement of the laser system mentioned above, there might be movement in the other axial directions rather than the motion in the laser optical axial direction or rotation of the laser material.

Especially, in case of the anisotropic material having the absorbance and thermal characteristic that can be differentiated according to the axial direction of the material, the movement and rotation of the material in an undesired direction can affect the power values of the laser including the central wavelength, the power intensity and beam shape during the oscillation of the laser.

Accordingly, in one embodiment of the present invention, the laser material assembly 130 may further include a device for precisely adjusting the position thereof on the module coupling bar 101, that is, a precise position adjusting device configured to adjust the position of the laser material assembly 130 by moving the laser material mount in the optical axial direction precisely.

Figure 20:
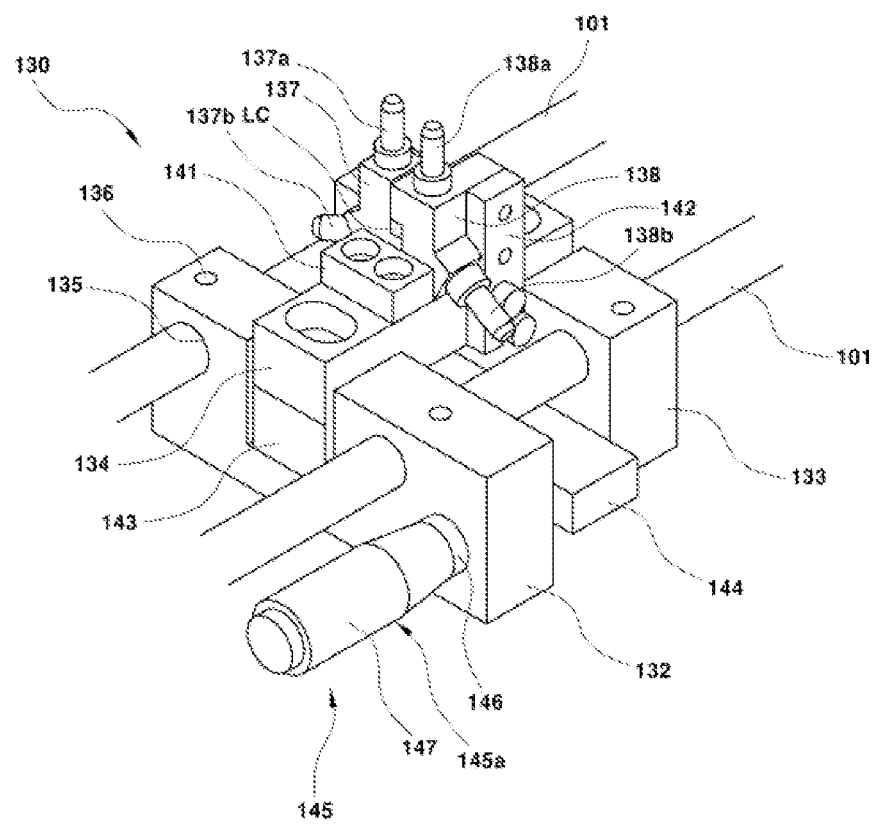
FIG. 20 is a perspective diagram illustrating a laser material assembly having a micro-position controlling device attached thereto in a light pumping module according to a further embodiment of the present invention.

One embodiment including the precise position adjusting device for performing the optical axial direction motion of the laser material mount more precisely is shown in FIG. 20.

According to the embodiment shown in FIG. 20, a linear stage type mechanism is provided in the laser material mount to enable the precise position adjustment. The coupling structure between the connecting blocks 132 and 133 and the module coupling bar 101, the coupling structure between the supporting block 134, the fixing block 141, the coupling block 142 and the cooling blocks 137 and 138 and the laser material (LC) may be identical to the coupling structures according to the embodiment of FIG. 15, except that the supporting block 134 assembled to the connecting blocks 132 and 133 to be movable in an optical axial direction.

At this time, the precise position adjusting device 145 is a mechanism configured to adjust the position of the supporting block 134 in the connecting blocks 132 and 133 coupled to the module coupling bar 101 precisely.

For the configuration of such the precise position adjusting device 145, an operating block 143 may be further disposed between the supporting block 134 and the connecting blocks 132 and 133.

In addition, the supporting block 134 may be fixedly coupled on the operating block 143 by a bolt or screw and the operating block 143 may be assembled on the connecting blocks 132 and 133 movably in the optical axial direction.

The supporting block 134 is directly fixed on the operating block 143. At the same time, the supporting block 134, the fixing block 141, the coupling block 142 and the cooling blocks 137 and 138 are integrated with each other. In case positions of such the integrally formed blocks are adjusted on the connecting blocks 132 and 133 in the optical axial direction, the position of the laser material may be also adjusted in the optical axial direction.

The precise position adjusting device 145 may further include an actuator to move the position of the supporting block 134 in the optical axial direction with respect to the connecting blocks 132 and 133. The actuator may be a manual actuator that can be a micrometer type manual actuator 145a.

In one embodiment, the operating block 143 may include a projected portion 144 arranged in front of and behind the connecting blocks 132 and 133 as shown in FIG. 19. The projected portion 144 is projected from a lateral surface of the operating block 143 and the micrometer type manual actuator 145a is installed between the projected portion 144 of the operating block 143 and one connecting block 132 arranged in front of the projected portion 144.

A typical micrometer has a structure configured of a thimble and a spindle movable forward and backward by rotation of a male screw mounted in a case, when the thimble is operated to rotate. At this time, the micrometer is a mechanism that is able to measure a distance between an anvil and a thimble based on gradations marked on the thimble and a sleeve.

According to the embodiment of the present invention may be provided a micrometer type manual actuator 145a including a case 146 and a spindle (not shown) provided in the case 146 and configured to move forward and backward when a thimble 147 is operated to rotate. As shown in FIG. 19, the actuator case 146 having the thimble 147 provided therein may be mounted in front of the connecting block 132 and the spindle moving forward and backward in the actuator case 146 is in close contact with the projected portion 144 of the operating block arranged there behind, after passing through the connecting block 132.

In addition, a return spring (not shown) may be installed between the projected portion 144 of the operating block 143 and the connecting block 133. The return spring is a coil spring to connect the projected portion 144 and the connecting block 133 facing the projected portion with each other.

The return spring is configured to generate an elastic restoring force capable of returning the projected portion 144 and the operating block 143 when the thimble 147 moved forward is moved backward by the rotational operation. The return spring is installed between a back surface of the projected portion 44 and a front surface of the connecting block 133.

At this time, both ends of the return spring may be directly fixed to the back surface of the projected portion 144 and the front surface of the connecting block 133 or they may be inserted in spring inserting grooves (not shown) formed in the back surface of the projected portion and the front surface of the connecting block, respectively.

Accordingly, when a user rotates the thimble 147, observing markings such as gradations, the spindle may move forward and a front end of the spindle may push the projected portion 144 to move the operating block 143 and the laser material (LC) such that the return spring may be compressed.

When the user rotates the thimble 147 in the reverse direction, the spindle may move backward and the force pushing the front end of the spindle is relived to restore the return spring elastically, such that the projected portion 144 may be moved forward by the elastic restoring force to move the operating block 143 and the laser material (LC) forward.

The precise operation of the micrometer type manual actuator 145*a* may enable the position of the laser material (LC) to be precisely adjusted in the optical axial direction.

Instead of the micrometer type manual actuator may be applied a motorized linear stage and an actuator that are configured to move the operating block forward and backward on the connecting block.

Figure 21:
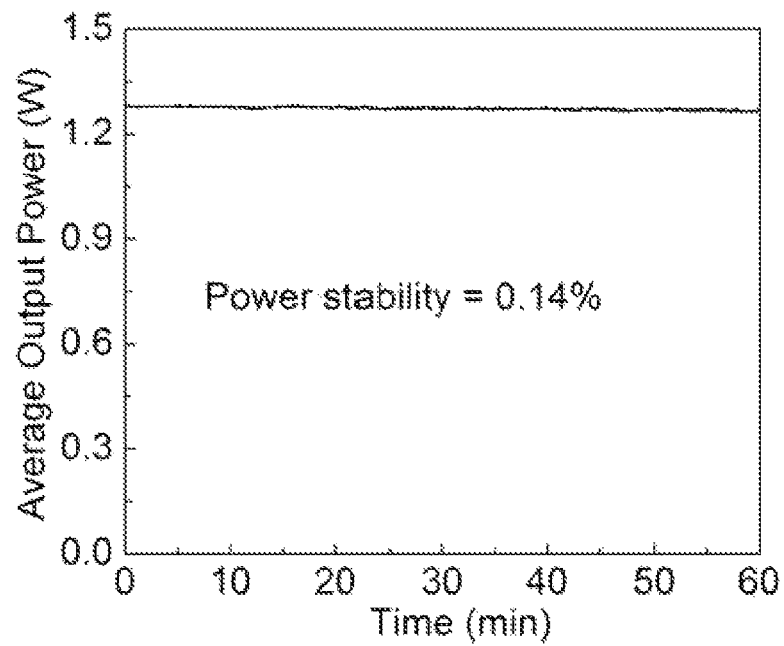
FIG. 21 is a graph illustrating intensity and changes in powers of the femtosecond pulse based on the time in the laser apparatus according to one embodiment of the present invention.

FIG. 21 is a graph illustrating intensity and changes in powers of the femtosecond pulse based on the time in the laser apparatus according to one embodiment of the present invention.

An average output power of 1.27 W that is a high output characteristic is realized by optimizing the position of the laser material via the integral type light pumping module. At this time, a repetition ratio is 87.8 MHz and energy for one pulse is 14 nJ.

A stability of an output value is 0.14% that enables very stable laser performance and it shows that the integral type light pumping module or the integral type case are designed to be less sensitive to change in temperatures locally near the optical components.

As a result, such a high output value or a high stability of the femtosecond laser shows that the femtosecond laser having the laser material integral type light pumping module realized by the embodiments of the present invention can realize excellent results.

Various variations and modifications of the femtosecond laser apparatus and the femtosecond laser system including the femtosecond laser apparatus are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for femtosecond laser optically pumped by a laser diode pumping module comprising:
    a laser diode for pumping light;
    a half-wave plate for adjusting a polarizing direction of a light generated from the laser diode;
    a collimating lens and a focusing lens for enhancing mode coupling with respect to the light of the laser diode and for focusing the light on the laser material; and
    dichroic mirrors arranged in both sides of the laser material, respectively, to reflect a laser beam generated via the laser material and to transmit a pumping light generated from the laser diode,
    wherein the half-wave plate, the collimating lens, the focusing lens and the dichroic mirrors are integrally connected with each other via mechanical coupling to form a light pumping module, in a state of being distant from a laser platform.

2. The apparatus for femtosecond laser optically pumped by the laser diode pumping module according to claim 1, further comprising:
    a mount for mounting each of the half-wave plate, the collimating lens, the focusing lens and the dichroic mirrors thereon;
    at least one module coupling bar for coupling the mounts to each other, with passing through the mounts; and
    a module coupler arranged on the laser platform to fixedly support the module coupling bar.

3. The apparatus for femtosecond laser optically pumped by the laser diode pumping module according to claim 1, wherein the laser material is directly installed on the laser platform by a laser material mount.

4. The apparatus for femtosecond laser optically pumped by the laser diode pumping module according to claim 1, further comprising:
    a reflection beam blocker arranged in a rear end of the half-wave plate to be positioned on the laser platform.

5. The apparatus for femtosecond laser optically pumped by the laser diode pumping module according to claim 2, wherein a thermal expansion coefficient of the module coupling bar is lower than a thermal expansion coefficient of the mounts or the module coupler.

6. An apparatus for femtosecond laser optically pumped by a laser diode pumping module comprising:
    a laser material of claim 1; and
    a light pumping module of claim 1 that is arranged in each of both sides with respect to the laser material.

7. The apparatus for femtosecond laser optically pumped by the laser diode pumping module according to claim 6, wherein a plurality of laser materials are provided and the plurality of the laser materials are aligned along a longitudinal center axis of the light pumping module, with being adjacent to each other.

8. An apparatus for femtosecond laser optically pumped by a laser diode pumping module comprising:
    a laser diode for pumping light;
    a half-wave plate for adjusting a polarizing direction of a light generated from the laser diode; a collimating lens and a focusing lens for applying the light to a laser material, for enhancing mode coupling and for focusing the light on the laser material;
    dichroic mirrors arranged in both sides of the laser material, respectively, to reflect a laser beam generated via the laser material and to transmit a pumping light generated from the laser diode;
    a plurality of mounts for mounting the half-wave plate, the collimating lens, the focusing lens and the dichroic mirrors thereon, respectively; and
    at least one connection means for connecting the plurality of the mounts with each other.

9. The apparatus for femtosecond laser optically pumped by the laser diode pumping module according to claim 8, wherein each of the plurality of mounts has at least one penetrating hole and the connection means is inserted in the penetrating hole to make the mounts aligned with each other.

10. An apparatus of femtosecond optically pumped by a laser diode pumping module comprising:
    an alignment unit mechanically assembled to sequentially align a half-wave plate, a collimating lens, a focusing lens and a dichroic mirror to form one light pumping module; and
    a coupler installed in a laser platform to be coupled to the alignment unit, such that the alignment unit is spaced apart a predetermined space from a laser platform.

11. The apparatus for femtosecond laser optically pumped by the laser diode pumping module according to claim 10, further comprising:
    a reflection beam blocker installed on the laser platform and positioned in a predetermined portion with respect to the half-wave plate toward the dichroic mirror.

12. The apparatus for femtosecond laser optically pumped by the laser diode pumping module according to claim 10, wherein the dichroic mirror is arranged in each of both sides with respect to the laser material, and
    the laser material is directly installed on the laser platform by a laser material mount.

13. The apparatus for femtosecond laser optically pumped by the laser diode pumping module according to claim 10, further comprising:
    a transmissive beam blocker installed behind the dichroic mirror to absorb a light having passed the dichroic mirror.

\* \* \* \* \*